United States Patent
Birch et al.

(10) Patent No.: US 7,532,617 B2
(45) Date of Patent: May 12, 2009

(54) METHOD AND APPARATUS FOR SESSION INITIATION PROTOCOL APPLICATION DESIGN, DEVELOPMENT, EXECUTION AND INTEGRATION

(75) Inventors: Oliver Birch, Annapolis, MD (US); Michael A. Gilfix, Austin, TX (US); Rhys D. Ulerich, Austin, TX (US); Paul Stuart Williamson, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 842 days.

(21) Appl. No.: 11/065,538

(22) Filed: Feb. 24, 2005

(65) Prior Publication Data

US 2006/0187902 A1 Aug. 24, 2006

(51) Int. Cl.
*H04L 12/66* (2006.01)
(52) U.S. Cl. ...................................... 370/352
(58) Field of Classification Search ............... None
See application file for complete search history.

(56) References Cited

U.S. PATENT DOCUMENTS

| | | | |
|---|---|---|---|
| 6,363,424 B1 | 3/2002 | Douglas et al. | 709/224 |
| 6,665,723 B2 | 12/2003 | Trossen | 709/227 |
| 6,671,364 B2 | 12/2003 | Rosera et al. | 379/207.02 |
| 6,687,356 B1 | 2/2004 | Glitho et al. | 379/201.12 |
| 6,704,396 B2 | 3/2004 | Parolkar et al. | 379/88.17 |
| 6,711,244 B2 | 3/2004 | Hayon et al. | 379/90.01 |
| 6,731,625 B1 | 5/2004 | Eastep et al. | 370/352 |

FOREIGN PATENT DOCUMENTS

WO  WO 01/46822  6/2001

OTHER PUBLICATIONS

Koskelainen et al., "A SIP-Based Conference Control Framework", ACM Digital Library, 2002, NOSSDAV '02 pp. 53-61.
Ramanathan et al., "Hierarchically-Organized, Multihop Mobile Wireless Networks for Quality-of-Service Support", Mobile Networks and Applications, 3 (1998) 101-110.
Lennox et al., "A Protocol for Reliable Decentralized Conferencing", ACM Digital Library, 2003, NOSSDAV '03, pp. 72-81.

(Continued)

*Primary Examiner*—Edan Orgad
*Assistant Examiner*—Blanche Wong
(74) *Attorney, Agent, or Firm*—Yee & Associates, P.C.; Herman Rodriguez

(57) ABSTRACT

A method, apparatus, and computer instructions are provided for a session initiation protocol application design, development, execution, and integration. A framework with a framework controller, an application data object, transition handlers, precondition handlers and post condition handlers is provided. When a message is received in a SIP application, the framework controller determines a state of application and parses the message to update application data by using corresponding handlers. The handlers for each state are specified in an input markup language model defined by a user externally via a Web service accessible component.

11 Claims, 8 Drawing Sheets

OTHER PUBLICATIONS

Cai et al., "Session Initiation Protocol and Web Services for Next Generation Multimedia Applications", Proceedings of the IEEE Fourth International Symposium on Multimedia Software Engineering (MSE '02), pp. 70-80.

Gurbani et al., "Accessing Telephony Services from the Internet", Dept. of Computer Science, Illinois Institute of Technology, Chicago, IL, USA, Proceedings 12th International Conference on Computer Communications and Networks (IEEE Cat. No. 03EX712), pp. 517-523, Published Piscataway, NJ, USA, 2003.

Liu et al., "An Approach of Integrating SIP in Converged Multimodal/Multimedia Communication Services", Proceedings 12th International Conference on Computer Communications and Networks (IEEE Cat. No. 03EX712) pp. 137-142, Published Piscataway, NJ, USA, 2003.

```
abstract class ApplicationData {
    ...                          602                              600
    public void setCurrentState(String stateName) {
    }    ...                     604
    public String getCurrentState() {
    }    ...                     608
    public abstract void updateAck(SipServletRequest request)
            throws FrameworkException;
    public abstract void updateBye(SipServletRequest request)
            throws FrameworkException;
    public abstract void updateCancel(SipServletRequest request)
            throws FrameworkException;
    public abstract void updateInfo(SipServletRequest request)
            throws FrameworkException;   610
    public abstract void updateInvite(SipServletRequest request)
            throws FrameworkException;
    public abstract void updateMessage(SipServletRequest request)
            throws FrameworkException;
    public abstract void updateNotify(SipServletRequest request)
            throws FrameworkException;
606 public abstract void updateOptions(SipServletRequest request)
            throws FrameworkException;
    public abstract void updatePrack(SipServletRequest request)
            throws FrameworkException;
    public abstract void updateRegister(SipServletRequest request)
            throws FrameworkException;
    public abstract void updateSubscribe(SipServletRequest request)
            throws FrameworkException;

public abstract void updateProvisionalResponse(SipServletReponse response)
            throws FrameworkException;
    public abstract void updateSuccessResponse(SipServletReponse response)
            throws FrameworkException;
    public abstract void updateRedirectResponse(SipServletReponse response)
            throws FrameworkException;
    public abstract void updateErrorResponse(SipServletReponse response)
            throws FrameworkException;
```

*FIG. 6*

```
                           700
                            \
        abstract class ConditionHandler {
                ...
                public abstract boolean isValid(ApplicationData data);
        }                             \                      \
                                      702                    704
```

```
800
abstract class TransitionHandler {  802
    ...
    protected void setDone(boolean val) {
    }   ...     804
    public boolean isDone() {
    }   ...     806
        public abstract void prepareHandler(ApplicationData data)
                throws FrameworkException;
        public abstract void doAck(SipServletRequest request, ApplicationData data)
                throws FrameworkException;
        public abstract void doBye(SipServletRequest request, ApplicationData data)
                throws FrameworkException;
        public abstract void doCancel(SipServletRequest request, ApplicationData data)
                throws FrameworkException;
        public abstract void doInfo(SipServletRequest request, ApplicationData data)
                throws FrameworkException;
        public abstract void doInvite(SipServletRequest request, ApplicationData data)
                throws FrameworkException;
        public abstract void doMessage(SipServletRequest request, ApplicationData data)
                throws FrameworkException;
        public abstract void doNotify(SipServletRequest request, ApplicationData data)
                throws FrameworkException;
        public abstract void doOptions(SipServletRequest request, ApplicationData data)
                throws FrameworkException;
        public abstract void doPrack(SipServletRequest request, ApplicationData data)
                throws FrameworkException;
        public abstract void doRegister(SipServletRequest request, ApplicationData data)
                throws FrameworkException;
        public abstract void doSubscribe(SipServletRequest request, ApplicationData data)
                throws FrameworkException;
        public abstract void doProvisionalResponse(SipServletResponse response,
    ApplicationData data)
                throws FrameworkException;
        public abstract void doSuccessResponse(SipServletResponse response,
    ApplicationData data)
                throws FrameworkException;
        public abstract void doRedirectResponse(SipServletResponse response,
    ApplicationData data)
                throws FrameworkException;
        public abstract void doErrorResponse(SipServletResponse response,
    ApplicationData data)
                throws FrameworkException;
    }
```

FIG. 8

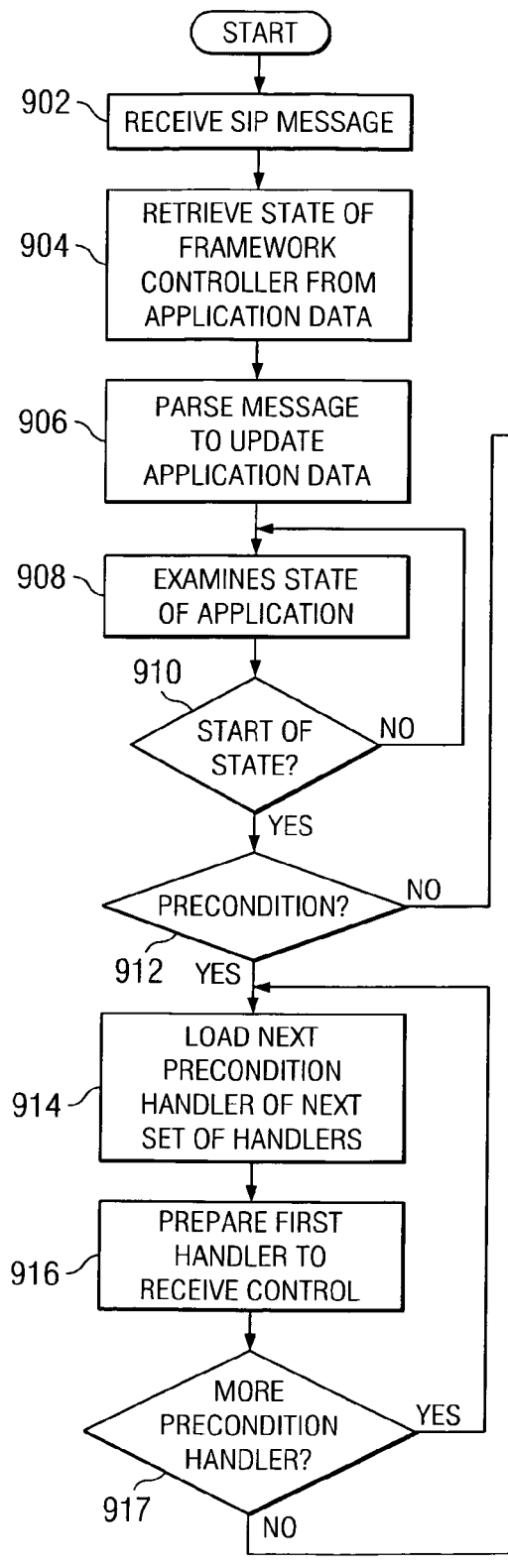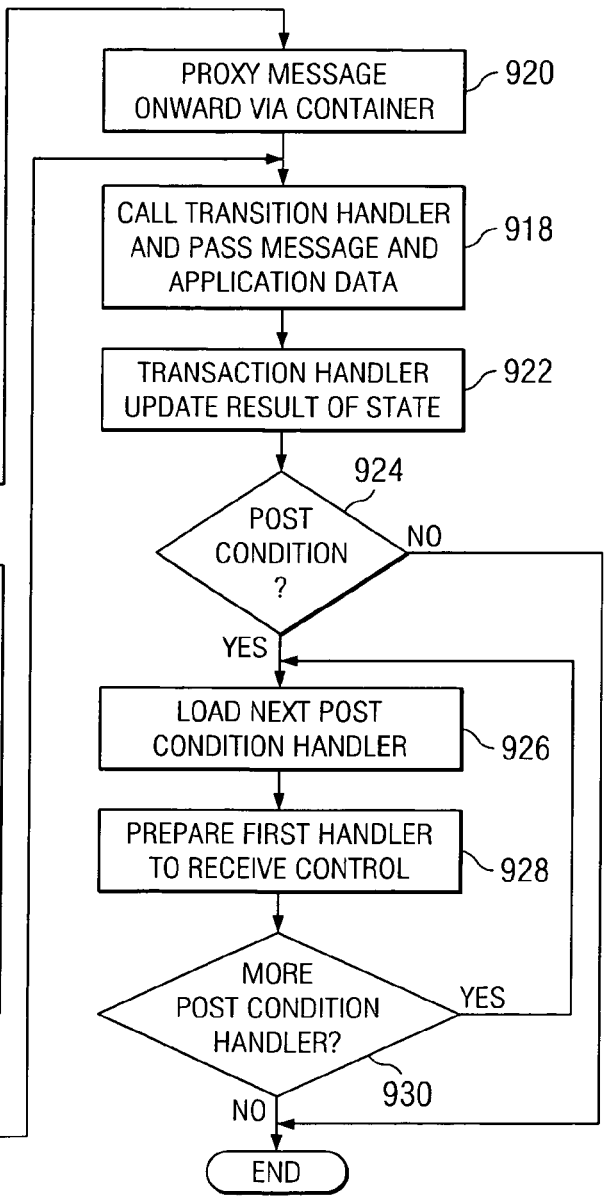
FIG. 9

FIG. 11 /1100

```xml
<SADApplication name="Callplacer"
        xmlns:sad="http://www.ibm.com/sad/schema"
        xmlns:xsi="http://www.w3.org/2001/XMLSchema-instance"
        xsi:schemaLocation="http://www.ibm.com/sad/schema
/WEB-INF/classes/com/ibm/sad/framework/depl/sad.xsd">
1102 <applicationDataClass>com.ibm.sad.callplacer.CallPlacerData</applicationDataClass>
    1104 <stateGraph>
                                                    1114
        <state name="Init"> 1106
            <destination transition="InitialP2PTransition">P2PCallState</destination>
            <destination transition="InitialConfTransition">ConfCallState</destination>
        </state>
        <state name="P2PCallState"> 1108   1116  1122
            <destination transition="P2PToConfTransition">ConfCallState</destination>
            <destination transition="TerminateP2PTransition">Terminate</destination>
        </state>                              1124
        <state name="ConfCallState"> 1110
            <destination transition="ConfTop29Transition">destination>
            <destination transition="TerminateConfTransition"></destination>
        </state>
        <state name="Terminate"/> 1112
    </stateGraph>
    <transitions>                    1114
        <transition name="InitialP2PTransition">
            <preconditionHandler>         1120
com.ibm.sad.callplacer.conditions.P2PTransitionPrecond</preconditionHandler>
            <transitionHandler name="InitialInvite"> 1117
com.ibm.sad.callplacer.handlers.InviteUA1</transitionHandler>
            <transitionHandler name="SecondaryInvite"> 1118
com.ibm.sad.callplacer.handlers.InviteUA2</transitionHandler>
        </transition>                    1124
        <transition name="TerminateP2PTransition">
            <preconditionHandler>         1126
com.ibm.sad.callplacer.conditions.P2PTransitionPrecond</preconditionHandler>
            <transitionHandler name="WaitForHangup"> 1128
com.ibm.sad.callplacer.handlers.WaitForHangup</transitionHandler>
        </transition>
    </transitions>
</SADApplication>
```

METHOD AND APPARATUS FOR SESSION INITIATION PROTOCOL APPLICATION DESIGN, DEVELOPMENT, EXECUTION AND INTEGRATION

BACKGROUND OF THE INVENTION

1. Technical Field

The present invention relates to an improved data processing system. In particular, the present invention relates to a session initiation protocol application in a data processing system. Still more particularly, the present invention relates to a framework for session initiation protocol application design, development, execution, and integration in a data processing system.

2. Description of Related Art

Session initiation protocol (SIP) is a signaling protocol for Internet conferencing, telephone, presence, event notification, and instant messaging. SIP was developed within the Multiparty Multimedia Session Control (MMUSIC) working group and issued by the Internet Engineering Task Force (IETF).

SIP allows disparate computers, phones, televisions, and software to communicate via SIP messages. The structure of a SIP message is similar to a hypertext transfer protocol (HTTP) message, but with an addressing scheme similar to simple mail transfer protocol (SMTP). Using SIP, users of the Internet may locate and contact one another regardless of media content and number of participants. SIP negotiates sessions, such that all participants may agree on and modify session features. Through SIP, participants may also add, drop, or transfer users.

When a user, user A, attempts to communicate with another user, user B, within the same domain using the same service provider, user A notifies a SIP proxy server of the identity of user B. Users A and B may use different media to communicate, for example, user A may use a SIP phone and user B may use a personal computer running a soft client that supports voice and video. The SIP proxy server then asks for and receives user B's internet protocol (IP) address from the SIP registrar server. SIP registrar server is a database that contains locations of all the users within a domain.

After the SIP proxy server receives the IP address of user B, the SIP proxy server relays user A's invitation to communicate with user B, including the medium or media user A is using. User E then informs the SIP proxy server that user A's invitation is acceptable and that he or she is ready to receive the message. Once the proxy server forwards user B's acceptance to user A, the SIP proxy server communicates the acceptance to user A, and thus, establishes the SIP session. Users A and B may then create a point-to-point connection using a communication protocol, such as real time protocol (RTP).

If user B is in a different domain, meaning that user B is using a different service provider, the SIP proxy server of user A recognizes that user B is in a different domain and queries the SIP redirect server for user B's IP address. SIP redirect server allows SIP proxy servers to direct SIP sessions to external domains and the SIP redirect server may reside in either or both domain A or B.

The SIP redirect server feeds user B's IP address back to the SIP proxy server, which in turn forwards the SIP session invitation to SIP proxy server in user B's domain. The SIP proxy server in user B's domain then delivers user A's invitation to user B, who forwards his or her acceptance along the same path the invitation traveled.

While SIP provides a flexible scheme for communication between different types of users, SIP applications have a number of disadvantages. One disadvantage of SIP applications is that developers of SIP applications often find it difficult to track SIP interactions as the complexity of SIP applications grows. SIP applications require developers to maintain application state and lifecycle, as well as execution flows, between different users. For example, if a two party call is joined by a third party, communication paths between parties increase as a result. This becomes a tedious task for developers of SIP applications, since state transitions between users also increase.

Another disadvantage is that current SIP applications provide no modeling capabilities for the developers. Thus, developers may not use modeling tools to model the application execution flow, to provide documentation, or structure the application architecture. Furthermore, SIP applications do not support business process elements that are outside of the SIP applications and do not execute in parallel with these elements. Thus, there is no connection between outside business process elements and infrastructure elements of SIP applications.

While some SIP application providers provide remote method invocation extensions for communication with SIP applications that are running on an application server, there is no existing mechanism within SIP applications that directly integrates with outside business elements. Moreover, developers may want to allow users to generate customized SIP applications. In this way, the users may interact with the SIP application directly, via Web forms or applications, in order to specify a list of options desired in the SIP application.

Therefore, it would be advantageous to have an improved method, apparatus, and computer instructions for a framework for SIP application design, development, and execution, such that application complexity may be reduced, which leads to simplified programming effort. It would also be advantageous to have an improved method that provides modeling capabilities to developers, integrates with outside business process elements, and allow users to generate customized SIP applications.

SUMMARY OF THE INVENTION

A method, apparatus, and computer instructions are provided for a framework for session initiation protocol application design, development, execution and integration in a data processing system. The framework includes an application data object, transition handlers, precondition handlers and post condition handlers. Upon receiving a message, the application data parses the message and populates its internal data container. Based on the states defined in an input markup language deployment descriptor, the framework controller invokes corresponding precondition, transition, and post condition handlers to process the message and updates the internal data. The present invention also provides a Web service accessible component that accepts user inputs from a Web service component for input model descriptions. In turn, the present invention generates a deployment descriptor based on the models at run time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating an exemplary implementation of application data object in accordance with a preferred embodiment of the present invention;

FIG. 8 is a diagram illustrating an exemplary implementation of transition handler object in accordance with a preferred embodiment of the present invention;

FIG. 9 is a flowchart of a process for processing SIP message by the framework in accordance with a preferred embodiment of the present invention;

FIG. 11 is a diagram illustrating an exemplary input XML deployment descriptor for the framework in accordance with a preferred embodiment of the present invention.

DETAILED DESCRIPTION OF THE PREFERRED EMBODIMENT

Figure 1:
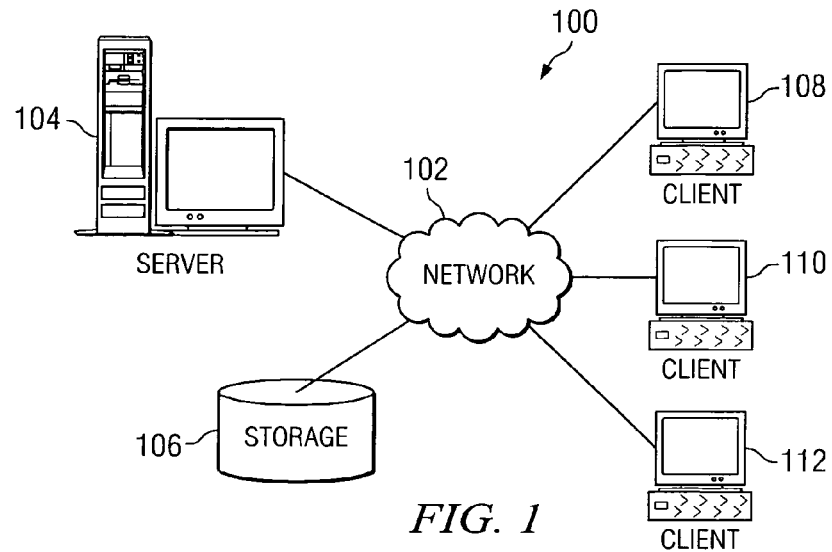
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
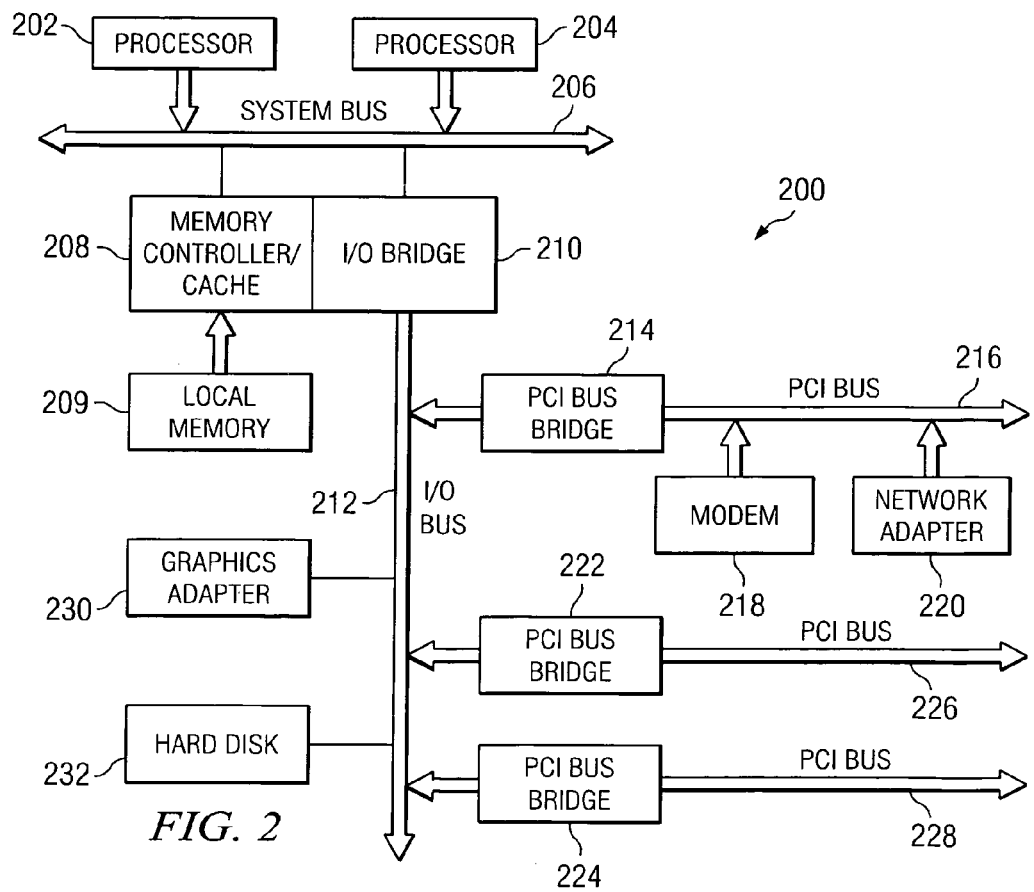
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
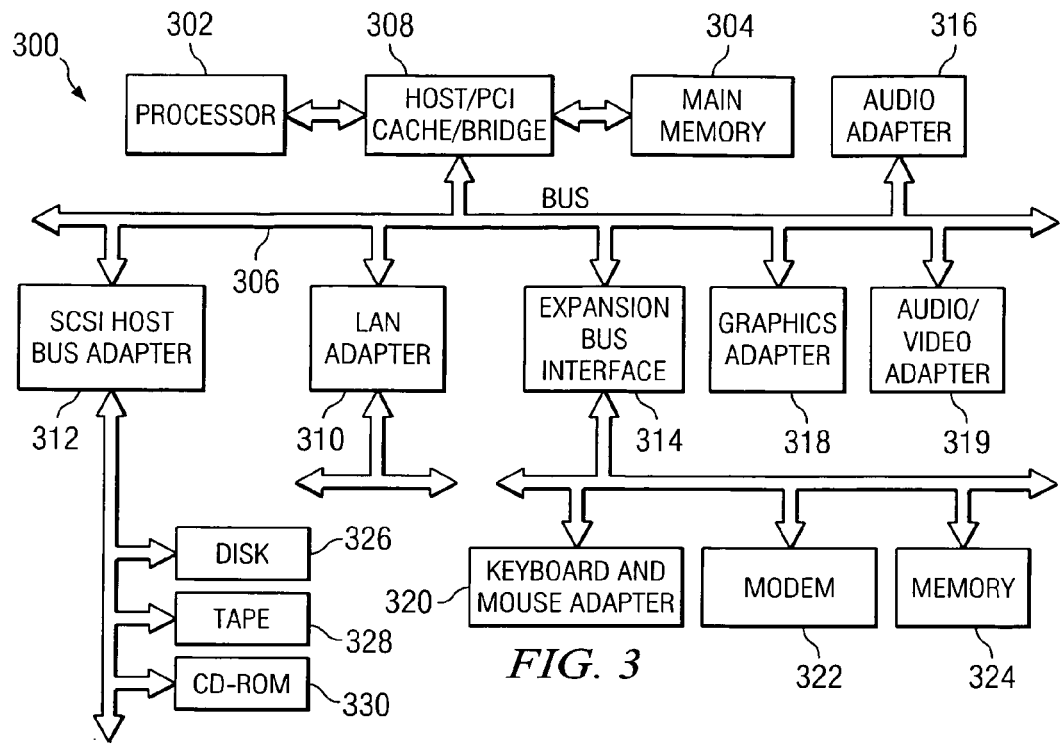
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM an order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for a framework of session initiation protocol (SIP) application design, development, and execution. The present invention provides a method that partitions SIP applications into modular components, and a framework for assembling and managing execution of these components. The framework provided by the present invention models SIP applications as state machines, which receives an input markup language model that describes various states of the application and application execution flows that occur during state changes. In the context of the present invention, a SIP application may be implemented using JSR 116 specification, which is a SIP Servlet application programming interface (API) specification based on the model of the existing Servlet API, available from Sun Microsystems, Inc.

The framework not only manages execution flows of SIP applications, but also storing and retrieving global application states on behalf of the SIP applications. The framework also determines which module components should receive flow control. This enables greater re-use of application components and reduces application complexity.

In a preferred embodiment, the framework provided by the present invention includes four major components that are specific to each application: application data, precondition handlers, transition handlers, and postcondition handlers. Application data is an object that holds global application state and data that is required throughout the lifetime of the application. Application data is also passed to various components to provide a common data container. When messages are received, application data parses the body of the messages and stores the data in an internal format for use by subsequent components.

Precondition handlers examine the application data object to determine if specific preconditions are met. Preconditions represent the state of the application data prior to a state transition. By examining the preconditions, the framework may determine the next state transition to be taken when processing an incoming message in a given state.

Transition handlers are modular or 'mini' SIP applications that contain logic for handling one aspect of the SIP application. Transition handlers receive and process SIP messages and store information in their own instance variables. The scope of the transition handlers is defined by the application developers. Transition handlers may be chained together to construct a state transition for a SIP application. Flow controls between transition handlers may be handled by a framework controller. If transition handlers are developed carefully, they may be reused.

Post condition handlers examine the application data object to determine if specific post conditions are met. Post conditions represent the state of the application data after a state transition. By examining the post conditions, the framework may determine if a state transition is successful.

The framework controller manages execution flows of the SIP application throughout its lifecycle. The framework controller takes an input markup language that describes information, including the application data object, flow of the application, and a list of state transitions in the application. The input markup language model may be an extensible markup language (XML) deployment descriptor that is deployed for a particular SIP application.

Application data object includes data that is specific to the application. The flow of application includes various states of the application and futures states that are accessible by each state. Thus, the flow of application is in a state machine format. In the list of state transitions, each state transition includes necessary precondition handlers, necessary post condition handlers, and a list of transition handlers to be executed for the state transition.

Figure 4A:
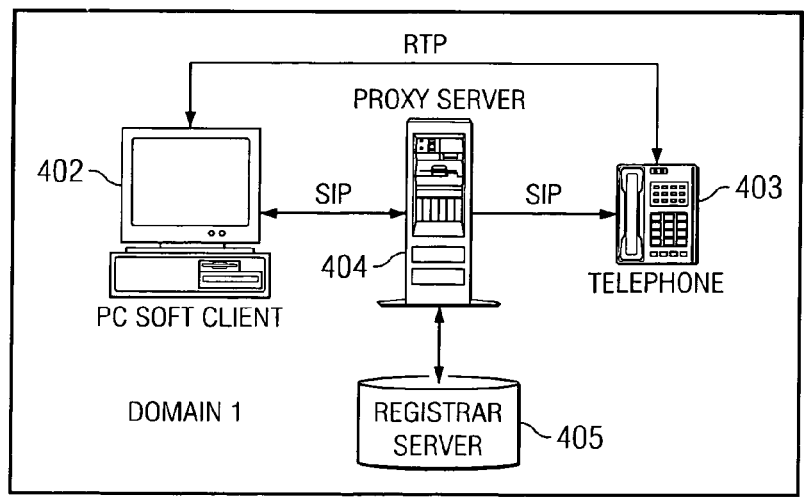
FIG. 4A is a diagram illustrating interactions between SIP users within the same domain in accordance with a preferred embodiment of the present invention.

Turning now to FIG. 4A, a diagram illustrating interactions between SIP users within the same domain is depicted in accordance with a preferred embodiment of the present invention. As depicted in FIG. 4A, domain 1 includes two users, PC soft client 402 and telephone 403. PC soft client 402 may be implemented as a data processing system, such as data processing system 300 in FIG. 3.

Upon power up, both PC soft client 402 and telephone 403 register their availability and their IP addresses with SIP proxy server 404 in domain 1. When a user of PC soft client 402 initiates a request to communicate with a user of telephone 403, PC soft client 402 notifies proxy server 404 using the session initiation protocol. Proxy server 404 in turn asks for and receives the IP address of telephone 403 from registrar server 405.

Proxy server 404 then relays the invitation to communicate from PC soft client 402, including its media type, to telephone 403. The user of telephone 403 informs proxy server 404 whether the invitation is accepted and if the user is ready to receive messages. If the invitation is accepted, the acceptance is communicated by proxy server 404 back to user of PC soft client 402. Thus, a SIP session is established. Hereafter, subsequent messages may be sent directly between PC soft client 402 and telephone 403 without interference by proxy server 404.

Figure 4B:
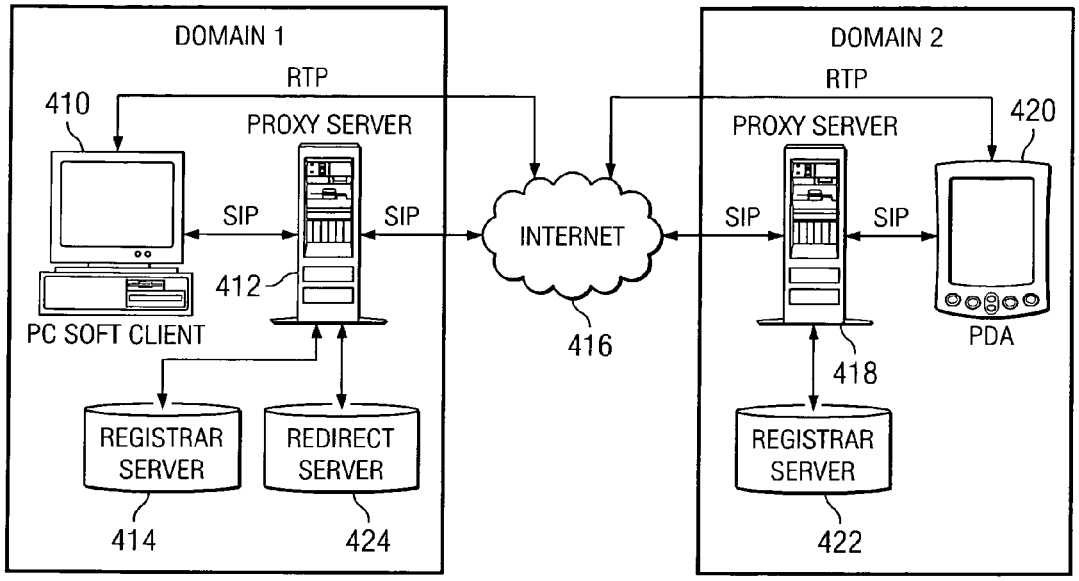
FIG. 4B is a diagram illustrating interactions between SIP users of different domains in accordance with a preferred embodiment of the present invention.

Turning now to FIG. 4B, a diagram illustrating interactions between SIP users of different domains is depicted in accordance with a preferred embodiment of the present invention. As depicted in FIG. 4B, a user of PC soft client 410 initiates a request to communicate with a user of personal digital assistant (PDA) 420. However, instead of domain 1, PDA 420 belongs to a different domain, domain 2.

In this case, when proxy server 412 receives the communication request from PC soft client 410, proxy server 412 recognizes that PDA 420 is in domain 2 and queries redirect server 424 for the IP address of PDA 420. Redirect server 424 may reside in either domain 1 or domain 2. Redirect server 424 then provides the IP address of PDA 420 to proxy server 412. Upon receiving the IP address, proxy server 412 forwards the SIP session invitation, via Internet 416, to proxy server 418 in domain 2, which forwards the invitation to a user of PDA 420. In turn, the user of PDA 420 may accept the invitation and the acceptance is sent back to the user of PC soft client 410 by proxy server 418.

Figure 5:
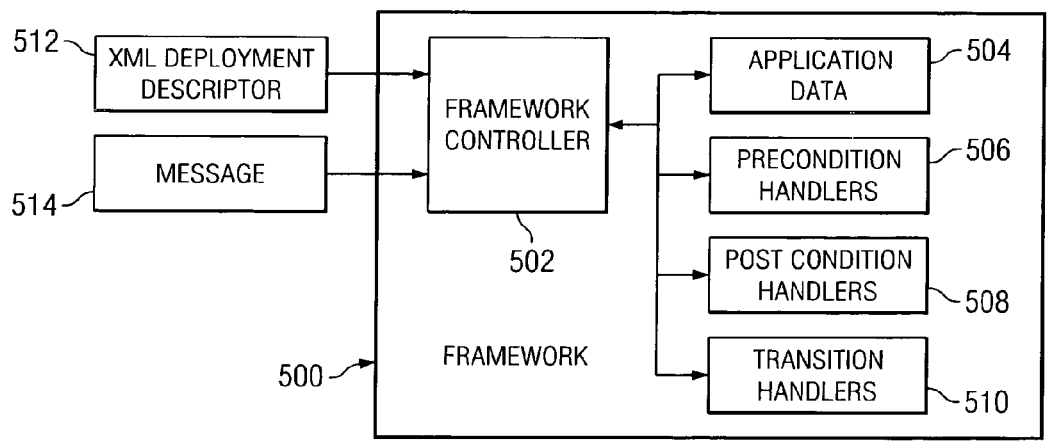
FIG. 5 is a diagram of component interactions for a framework of SIP application design, development, and execution in accordance with a preferred embodiment of the present invention.

Turning now to FIG. 5, a diagram of component interactions for a framework of SIP application design, development, and execution is depicted in accordance with a preferred embodiment of the present invention. As depicted in FIG. 5, framework 500 includes framework controller 502, application data 504, precondition handlers 506, post condition handlers 508 and transition handlers 510.

When a SIP application is deployed to a user environment, a deployment description, such as XML deployment descriptor 512, is also deployed to configure the SIP application for execution. XML deployment descriptor 512 describes information about the SIP application, including data specific to the application, the flow of the application, and a list of transitions in the application.

When a user sends request message 514 via the SIP application to another user, framework controller 502 uses XML deployment descriptor 512 as an input to framework 500. Framework controller 502 then parses message 514 and updates application data 504 with message contents. Framework controller 502 then retrieves a state of the application from application data 504 and determines if the application is at the start of a state.

If the application is at a start of a state, framework controller 502 evaluates preconditions by examining application data 504 to determine which state transition to take. If no precondition is defined, framework controller 502 proxies the message to the next transition handler 510 for the state transition. If preconditions are defined, framework controller 502 loads the next set of precondition handlers 506 to determine if specific preconditions are met. After each precondition handler 506 determines that preconditions are met, framework controller 502 invokes methods of each transition handler 510 according to XML deployment descriptor 512 and passes in message 514 and application data object 504 as input arguments. Each transition handler 510 then updates the result of the state of the application, which includes evaluating post conditions using post condition handlers 508. Thus, using framework 500, a user may keep track of all states on behalf of the SIP application.

Turning now to FIG. 6, a diagram illustrating an exemplary implementation of an application data object is depicted in accordance with a preferred embodiment of the present invention. As shown in FIG. 6, application data class 600 is an abstract class that includes a number of methods, namely: setCurrentState method 602, getCurrentState method 604, and methods 606.

SetCurrentState method 602 and getCurrentState method 604 allows the framework controller to get and set the state of an application, for example, the 'init' state. Methods 606, including updateAck 608 and updateInvite 610, are update methods that update internal data in the common data container when a message is parsed by the application data object. Methods 606 takes a SipServletRequest object as an input to update the internal data based on the request.

When constructing a SIP application to handle servlet requests, a client extends a SIP servlet class, SipServletRequest, and implements the appropriate 'do' methods. 'Do' methods handle incoming requests. The client also provides a SIP deployment descriptor that indicates the kind of messages that SIP application is interested in receiving, for example, invite or register methods.

In addition, the SIP application provides a servlet deployment descriptor that describes how messages are routed to the SIP servlet, as well as a series of extensions that add primitives to the protocol, for example, the SIMPLE extensions, which add instant messaging capabilities to the SIP protocol.

Figures 7, 10:
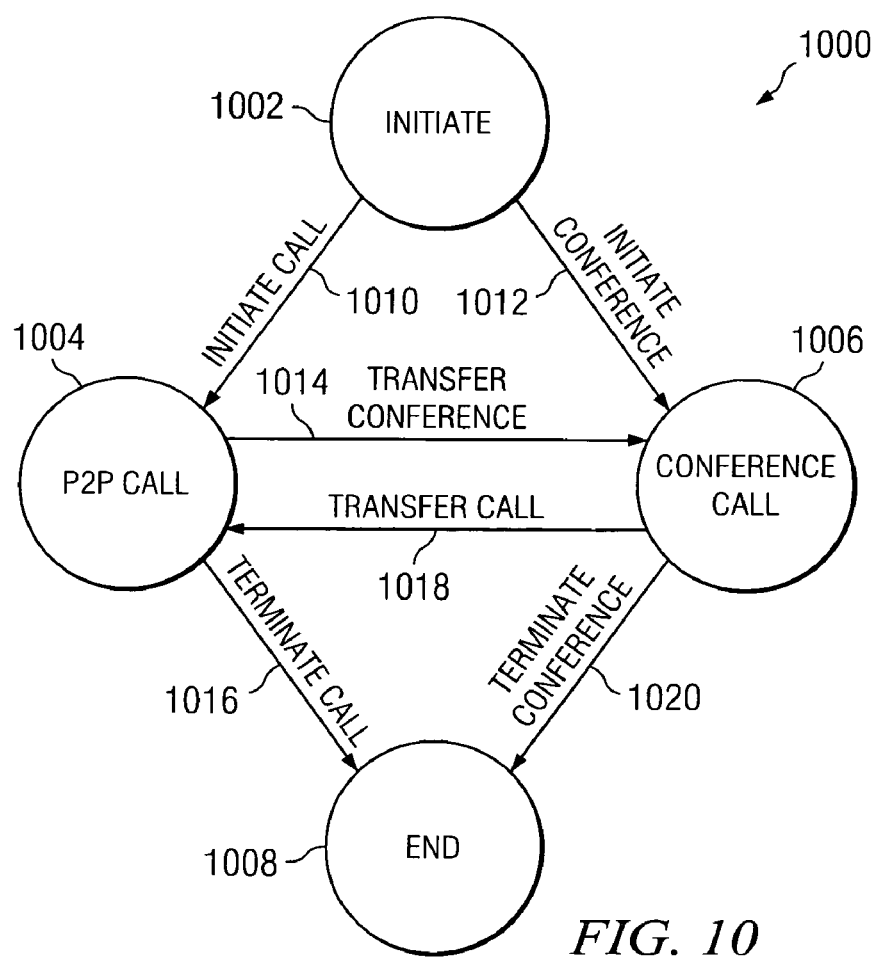
FIG. 7 is a diagram illustrating an exemplary implementation of pre or post condition handler object in accordance with a preferred embodiment of the present invention.
FIG. 10 is a diagram illustrating an exemplary state transition diagram for a back to back user agent in SIP in accordance with a preferred embodiment of the present invention.

Turning now to FIG. 7, a diagram illustrating an exemplary implementation of pre or post condition handler object is depicted in accordance with a preferred embodiment of the present invention. In this example, as shown in FIG. 7, condition handler abstract class 700 includes an 'isvalid' method 702, which takes an application data object 704 as an input. 'IsValid' method 702 determines if internal data in the application data object 704 meets the condition that is specified in the handler.

Turning now to FIG. 8, a diagram illustrating an exemplary implementation of transition handler object is depicted in accordance with a preferred embodiment of the present invention. As shown in FIG. 8, transition handler 800 includes 'setDone' method 802, 'isDone' method 804, prepareHandler method 806, and methods 808.

'SetDone' method 802 and 'isDone' method 804 sets and determines if the handler is finished handling the state transition. PrepareHandler method 806 allows a previous handler in a set of transition handlers to prepare this handler for handling the request. Methods 808 are 'do' methods used by the transition handler to process SIP messages.

Turning now to FIG. 9, a flowchart of a process for processing a SIP message by the framework is depicted in accordance with a preferred embodiment of the present invention. This process is from a perspective of the SIP application implementing the framework. As depicted in FIG. 9, the process begins when a SIP message is received by a SIP application (step 902).

The SIP application then retrieves a state of the framework controller from the application data (step 904). The framework controller then updates the internal data in the common data container of the application data with the message content by parsing the incoming message (step 906). In turn, the framework controller examines the state of the application (step 908) and determines as to whether the application is at a start of a state (step 910). If the application is not at a start of a state, the process returns to step 908 to continue examining the state of the application. If the application is at a start of a state, the framework controller evaluates the state to determine if a precondition is specified (step 912). If no precondition is specified, the framework controller proxies the message via the container (step 920) and continues to step 918. If a precondition is specified, the framework controller loads the next handler of the set of precondition handlers to handle the state (step 914) and prepares the next handler to receive control (step 916). Next, a determination is made by the framework controller as to whether additional precondition handlers are present (step 917). If additional precondition handlers are present, the process returns to step 914 to load the next precondition handler. Otherwise, the process continues to step 918.

At step 918, the framework controller calls the transition handler and passes in the SIP message and application data as arguments (step 920). The transition handler then updates the result of the state (step 922). When the transition handler updates the result, the transition handler evaluates the post condition handlers at the end of the state and determines if post conditions exist (step 924). If post conditions exist, the process terminates thereafter.

If post conditions exist, the transition handler loads the post condition handler (step 926) and prepares the post condition handler to receive control (step 928). Next, a determination is made by the framework controller as to whether additional post condition handlers are present (step 930). If additional post condition handlers are present, the process returns to step 926 to load the next post condition handler. Otherwise, the process terminates thereafter.

As described above, the framework provided by the present invention receives an input model that describes various states of the application and application execution flows that occur during state changes. This description may be defined using a deployment descriptor file in a markup language format. In this way, developers may use a modeling tool to diagram all possible states and transitions for a particular application and transform the model using the present invention into a markup language representation, with labels for all the states and transitions. In a preferred embodiment, the markup language representation is an extensible markup language (XML) representation.

Turning now to FIG. 10, a diagram illustrating an exemplary state transition diagram for a back to back user agent in SIP is depicted in accordance with a preferred embodiment of the present invention. When a call is placed by a back to back user agent or a callplacer, the SIP application establishes a call between the parties on behalf of a user agent. Throughout the lifetime of the call, the number of parties may change. Thus, the SIP application has to be able to transfer from a direct P2P call to a conference call or vice versa.

As depicted in FIG. 10, state transition diagram 1000 includes state transitions involved for initiating, transferring, and terminating P2P and conference calls. In state transition diagram 1000, each circle represents a state and each arrow represents a state transition. Each state includes one or more state transitions and each state transition involves one or more steps, meaning multiple handlers. Thus, for each state, there may be one or more transition handlers that are chained to handle one or more state transition.

In this example, state transition diagram 1000 includes four states: init 1002, P2P call 1004, conf call 1006 and end 1008. Init 1002 includes two state transitions, initiate call 1010 and initiate conf 1012. P2P call 1004 also includes two state transitions, xfer conf 1014 and terminate call 1016. Similarly, conf call 1006 includes two state transitions, xfer call 1018 and terminate conf 1020. End 1008 does not have any state transition, since all calls are terminated.

Turning now to FIG. 11, a diagram illustrating an exemplary input XML deployment descriptor for the framework is depicted in accordance with a preferred embodiment of the present invention. As shown in FIG. 11, XML deployment descriptor 1100 is generated by the present invention after transforming state transition diagram 1000 in FIG. 10 into a XML deployment descriptor.

XML deployment descriptor 1100 defines application data class 1102, which is designated as a common data container for the application. XML deployment descriptor 1100 also defines state graph 1104, which includes a number of states: init 1106, P2PCallState 1108, ConfCallState 1110 and Terminate 1112. Init 1106 corresponds to init state 1002 in FIG. 10. P2PCallState 1108 corresponds to P2PCall state 1004 in FIG. 10. ConfCallState 1110 corresponds to conf call state 1006 in FIG. 10 and Terminate 1112 corresponds to end state 1008 in FIG. 10.

In this example, Init 1106 includes two state transitions, initialP2PTransition 1114 and InitialConfTransition 1116. For initialP2PTransition 1114, there are two transition handlers, InitialInvite 1117 and SecondaryInvite 1118, and one precondition handler, P2PTransitionPrecond 1120.

Also shown in FIG. 11, P2PCallState 1108 includes two state transitions, P2PToConfTransition 1122 and TerminateP2PTransition 1124. For TerminateP2PTransition 1124, there is a precondition handler, P2PTrasitionPrecond 1126 and one transition handler, WaitForHangUp 1128.

When changes are made to state transition diagram 1000 in FIG. 10, the present invention synchronizes the changes with XML deployment descriptor 1100. Instead of using a precondition handler, such as P2PTrasitionPrecond 1120 and 1126, the present invention may include Boolean expressions in a markup language format, such as extensible markup language (XML) format. Furthermore, the present invention may include other modeling descriptions, such as Unified Modeling Language (UML) class descriptions and generate transition handlers to support the descriptions at run time.

In addition to state diagrams and class descriptions, the present invention provides additional components in the framework that allow the input model to be defined externally using a Web service module. For example, a business workflow modeling tool, known as BPEL4WS, may be used to define an executable business process. The logic and state of the process determine the nature and sequence of the Web service interactions conducted at each business partner, and thus interaction protocols.

The interaction protocols describe the behavior of a business process based on interactions between the process and its partners. The interaction with each partner occurs through Web Service interfaces. When the business process is defined, BPEL4WS allows the process and the interaction protocols to be exported and imported using markup languages, such as XML and Web Services Description Language (WSDL).

The present invention accommodates the kind of definition, such as BPEL4WS, by providing a Web service accessible component. The Web service accessible component may be implemented as an enterprise JavaBeans™ interface with a corresponding WSDL definition that provides Web services access to the framework. The EJB interface coordinates with the framework controller to initiate a SIP application instance. The initiation may be communicated within the application server process itself, or via a SIP message with a special body if the framework runs within a servlet.

In addition to providing the Web service accessible component, the present invention also provides serialization functionality to serialize application state into a format that is appropriate for invoking an internal or external Web service that is bound to a business process, such that SIP activities may correspond to business process level activities.

Since SIP application can receive event at any time and that the events are managed by the framework controller, the input business process model activity has to execute sequentially. Thus, the business logic has to execute in parallel for the life time of the conference call. Thus, using the present invention, a business process may be defined such that a message to a billing system may be sent at the start of a call. When the call terminates, a parallel message may be sent to indicate that the call is terminated.

By providing a Web service accessible component, users may create specialized SIP applications dynamically, using interactive Web forms or wizards. In this way, a customer may select a number of options for a number of communication systems, for example, automated menu system, conference authentication mechanism, etc. In addition, a deployment descriptor for the options selected may be generated by the present invention automatically to the application server on behalf of the user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A signaling protocol application framework for executing a signaling protocol application, comprising:
    a controller for receiving a descriptor and a request message, wherein the controller parses the request message, and wherein the descriptor defines a plurality of state transitions that occur during an execution of the application;
    application data, the application data comprising global application data and global application state data required for the execution of the application;
    a plurality of precondition handlers for examining the application data and for determining if a precondition is met;
    a plurality of postcondition handlers for examining the application data and for determining if a postcondition is met; and
    a plurality of transition handlers for receiving and processing request messages, each of the plurality of transition handlers having one or more respective instance variables, wherein the controller examines a state of the application and determines whether the application is at a start of the state, wherein the controller, responsive to determining the application is at the start of the state, evaluates the state to determine if a precondition is specified by the state, and wherein the controller, responsive to determining that the precondition is specified by the state, loads a precondition handler of the plurality of precondition handlers to determine whether the precondition is met.

2. The signaling protocol application framework of claim 1, wherein the descriptor comprises an extensible markup language deployment descriptor.

3. The signaling protocol application framework of claim 1, wherein the request message and the application data are supplied to a transition handler of the plurality of transition handlers.

4. The signaling protocol application framework of claim 1, wherein the plurality of postcondition handlers, responsive to the plurality of transition handlers updating the application data, evaluate postconditions of the application data.

5. A computer program product, comprising:
    a recordable-type computer readable medium storing computer readable program code for executing a signaling protocol application, the computer program product comprising:
    first instructions that receive a descriptor and a request message and that parse the request message, wherein the descriptor defines a plurality of state transitions that occur during an execution of the application;
    second instructions that define application data, the application data comprising global application data and global application state data required for the execution of the application;
    third instructions that define a plurality of precondition handlers for examining the application data and for determining if a precondition is met;
    fourth instructions that define a plurality of postcondition handlers for examining the application data and for determining if a postcondition is met; and
    fifth instructions that define a plurality of transition handlers for receiving and processing request messages, each of the plurality of transition handlers having one or more respective instance variables, wherein the first instructions examines a state of the application and determines whether the application is at a start of the state, wherein the first instructions, responsive to determining that the application is at the start of the state, evaluates the state to determine if a precondition is specified by the state, and wherein the first instructions, responsive to determining that the precondition is specified by the state, loads the third instructions to determine whether the precondition is met.

6. The computer program product of claim 5, wherein the descriptor comprises an extensible markup language deployment descriptor.

7. The computer program product of claim 5, wherein the fifth instructions further supplies the request message and the application data to a transition handler of the plurality of transition handlers.

8. The computer program product of claim 5, wherein the fourth instructions, responsive to the fifth instructions updating the state of the application data, evaluate postconditions of the application data.

9. A data processing system for executing a signaling protocol application, comprising:
    a memory that contains a set of instructions, the set of instructions comprising a signaling protocol application, a controller, and application data, the application data comprising global application data and global application state data required for an execution of the application; and a processor, responsive to execution of the set of instructions, that receives a descriptor that defines a plurality of state transitions that occur during the execution of the application and a request message, wherein the controller parses the request message, and wherein the set of instructions comprise logic for examining the application data to determine if a precondition is met, for examining the application data to determine if a postcondition is met, and transition handler logic including instance variables, wherein the transition handler logic receives and processes the request message, wherein the controller examines a state of the application data and determines whether the application is at a start of the state, wherein the controller, responsive to determining the application is at the start of the state, evaluates the state to determine if a precondition is specified by the state, and wherein the controller, responsive to determining that the precondition is specified by the state, loads a precondition handler of a plurality of precondition handlers to determine whether the precondition is met.

10. The data processing system of claim 9, wherein the descriptor comprises an extensible markup language deployment descriptor.

11. The data processing system of claim 9, wherein a plurality of postcondition handlers, responsive to the transition handler logic updating the state of the application data, evaluate postconditions of the application data.

* * * * *